(12) United States Patent
Wang et al.

(10) Patent No.: US 8,407,661 B2
(45) Date of Patent: Mar. 26, 2013

(54) METHOD AND SYSTEM FOR CREATING HMI APPLICATIONS FOR AN AUTOMATION PROCESS

(75) Inventors: Jianjun Wang, West Hartford, CT (US); Xiongzi Li, West Hartford, CT (US); Carlos Martinez, West Hartford, CT (US); Thomas Fuhlbrigge, Ellington, CT (US)

(73) Assignee: ABB Research Ltd., Zurich (CH)

( * ) Notice: Subject to any disclaimer, the term of this patent is extended or adjusted under 35 U.S.C. 154(b) by 1214 days.

(21) Appl. No.: 12/181,003

(22) Filed: Jul. 28, 2008

(65) Prior Publication Data
US 2010/0023141 A1 Jan. 28, 2010

(51) Int. Cl.
G06F 9/44 (2006.01)
(52) U.S. Cl. ........... 717/100; 717/109; 717/117; 700/86
(58) Field of Classification Search .......... 717/100–167; 700/86
See application file for complete search history.

(56) References Cited

U.S. PATENT DOCUMENTS

| | | | |
|---|---|---|---|
| 6,330,006 B1 | 12/2001 | Goodisman | |
| 6,430,609 B1 * | 8/2002 | Dewhurst et al. | 709/220 |
| 6,556,950 B1 * | 4/2003 | Schwenke et al. | 702/183 |
| 6,618,856 B2 * | 9/2003 | Coburn et al. | 717/135 |
| 6,862,553 B2 * | 3/2005 | Schwenke et al. | 702/183 |
| 7,072,810 B2 * | 7/2006 | Ramanathan et al. | 703/2 |
| 2004/0021679 A1 | 2/2004 | Chapman et al. | |
| 2005/0229189 A1 * | 10/2005 | McManus | 719/330 |
| 2006/0059460 A1 * | 3/2006 | Phillips et al. | 717/109 |
| 2006/0271390 A1 * | 11/2006 | Rich et al. | 705/1 |

FOREIGN PATENT DOCUMENTS

| | | |
|---|---|---|
| WO | 9847068 | 10/1998 |
| WO | 2010014397 | 2/2010 |

OTHER PUBLICATIONS

Cook, Jonathan E.; Wolf, Alexander L.; "Automating Process Discovery through Event-Data Analysis," Software Engineering, 1995. ICSE 1995. 17th International Conference on , pp. 73-82.*
Shimanuki, Y.; "OLE for process control (OPC) for new industrial automation systems ," Systems, Man, and Cybernetics, 1999. IEEE SMC '99 Conference Proceedings. 1999 IEEE International Conference on , vol. 6, pp. 1048-1050.*
Dayal et al.; "Business Process Coordination: State of the Art, Trends, and Open Issues," Proceedings of the 27th VLDB Conference, Roma, Italy, 2001, pp. 1-11.*
"labVIEW Getting Started with LabVIEW-virtual instruments" National Instruments User Manual, XX,XX, Apr. 1, 2003 pp. 1-1, XP002422858 the whole document.

* cited by examiner

*Primary Examiner* — Wei Zhen
*Assistant Examiner* — Satish Rampuria
(74) *Attorney, Agent, or Firm* — Michael M. Rickin; Melissa J. Szczepanik

(57) ABSTRACT

There is described a method and system for developing for an automation process a screen viewable on a target computer that has user interface objects. A development computer has a set of common design time components from a general purpose software development kit that also has a databinding facility and a set of customization components. Those components have an interface that allows access to the available for use automation process data objects and a process object picker that act as a user interface to the databinding facility to allow the browsing of a subset of the available for use data objects and selecting of one or more of the objects in the subset for binding by the databinding facility either to one or more members of the user interface objects or one or more of the user interface objects or a combination of the same.

12 Claims, 7 Drawing Sheets

1

METHOD AND SYSTEM FOR CREATING HMI APPLICATIONS FOR AN AUTOMATION PROCESS

FIELD OF THE INVENTION

This invention relates to a tool for developing a Human Machine Interface (HMI) for an automation process.

DESCRIPTION OF THE PRIOR ART

A HMI in an automation process is a software application (typically a Graphical User Interface or GUI) that presents information to the operator about the state of a process, and accepts and implements the operator's control instructions. The HMI may also interpret the process information and guide the interaction of the operator with the system that is used to automate and control the process.

A HMI provides many benefits to the user. In human factor terms, these benefits include, but are not limited to, that the HMI is easy to learn and remember, less likely to produce errors, more efficient in accomplishing goals and more pleasing to use. With the advancement of computer technologies, a HMI has become the essential part of a product, process or system's usability.

A HMI development system includes two parts, the development environment residing in a development computer and the runtime environment residing in a target computer. A developer typically uses the development environment on the development computer to create a HMI application, which is then downloaded to the target computer for execution.

Existing HMI development tools targeted for non-programmers in the process automation industry are proprietary software. Commercial HMI development products now on the market for that industry such as RSView from Rockwell Automation, Simatic from Siemens, and WonderWare from Invensys Systems fall into this category. As shown in the system 100 of FIG. 1, the proprietary HMI tool provides its own development environment 104 on the development computer 101 and possibly its own simple programming language (often referred as a macro or scripting). In addition, a proprietary runtime environment 105 is required to execute the created HMI applications 103 on the target computer 102 since most often the HMI application 103 has a proprietary format. Obviously tools in this category suffer from high cost, and a lack of openness and flexibility.

This approach is no longer necessary since as the general purpose GUI tools have advanced to the level of the current freely available general purpose NET Framework software development kit (SDK) and Java SDK. The majority of the components needed in a HMI development environment are found in these general purpose SDKs. In addition, the current general purpose SDK products provide customization opportunities. Even with this functionality these general purpose SDKs are not easy for non-programmer in the automation industry such as operators to use to develop new GUIs or make changes to existing GUIs.

Therefore it is very desirable to have a HMI development tool that makes use of a general purpose SDK but is low cost, is easy for non-programmers to use, openness and flexibility.

SUMMARY OF THE INVENTION

A system for developing for an automation process a viewable screen having user interface objects. The automation process has a set of data objects available for use in the system. The system has:

a set of common design time components from a general purpose software development kit having a screen design surface onto which the user interface objects are placed and a databinding facility;

a set of customization components having:

an automation process object interface that allows access to the available for use automation process data objects, and a process object picker serving as a user interface to the databinding facility to allow:

browsing a subset of the available for use automation process data objects, and selecting of one or more of the objects in the subset for binding by the databinding facility either to one or more of members of the user interface objects, one or more of the user interface objects, or a combination of one or more of the members and one or more of the user interface objects, each of the one or more subset data objects influencing both the appearance and behavior of the screen when so bound.

The data object of the one or more subset data objects of the available for use automation process data objects can be dragged and dropped onto the screen design surface so as to create a corresponding user interface object. As a result of this action, the corresponding user interface object is automatically bound to the dragged data object when the dragged data object is placed on the screen design surface.

A computer program product on a tangible computer medium for developing for an automation process a viewable screen having user interface objects. The automation process has a set of data objects available for use in said computer program product. The computer program product has:

computer usable program code configured to provide a set of common design time components from a general purpose software development kit, said common design time components having a screen design surface onto which the user interface objects are placed and a databinding facility; and computer usable program code configured to provide a set of customization components having:

computer usable program code configured to provide an automation process object interface that allows access to the available for use automation process data objects, and computer usable program code configured to provide a process object picker serving as a user interface to the databinding facility to allow:

browsing a subset of the available for use automation process data objects, and selecting of one or more of the objects in the subset for binding by the databinding facility either to one or more of members of the user interface objects, one or more of the user interface objects, or a combination of one or more of the members and one or more of the user interface objects, each of the one or more subset data objects influencing both the appearance and behavior of the screen when so bound.

The data object of the one or more subset data objects of the available for use automation process data objects can be dragged and dropped onto the screen design surface so as to create a corresponding user interface object. The corresponding user interface object is automatically bound to the dragged data object when the dragged data object is placed on the screen design surface.

A system for developing for an automation process a viewable screen having user interface objects. The automation process has a set of data objects available for use in the system. The system has:

a computing device having therein program code usable by the computing device, the program code having:

code configured to provide a set of common design time components from a general purpose software development kit, the common design time components comprising a screen design surface onto which the user interface objects are placed and a databinding facility; and code configured to provide a set of customization components having:

code configured to provide an automation process object interface that allows access to the available for use automation process data objects, and code configured to provide a process object picker serving as a user interface to the databinding facility to allow:

browsing a subset of the available for use automation process data objects, and selecting of one or more of the objects in the subset for binding by the databinding facility either to one or more of members of the user interface objects, one or more of the user interface objects, or a combination of one or more of the members and one or more of the user interface objects, each of the one or more subset data objects influencing both the appearance and behavior of the screen when so bound.

The data objects can be dragged and dropped onto the screen design surface so as to create a corresponding user interface object. The corresponding user interface object is thereby automatically bound to the dragged data object when the dragged data object is placed on the screen design surface.

DETAILED DESCRIPTION

The present invention is an open HMI development system for use by non-programmers in the automation industry. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

As can be appreciated by one of ordinary skill in the art, the present invention may take the form of a computer program product on a tangible computer-usable or computer-readable medium having computer-usable program code embodied in the medium. The tangible computer-usable or computer-readable medium may be any tangible medium such as by way of example but without limitation, a portable computer diskette, a flash drive, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in an object oriented programming language such as Java, Smalltalk, C++ or the like, or may also be written in conventional procedural programming languages, such as the "C" programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 1:
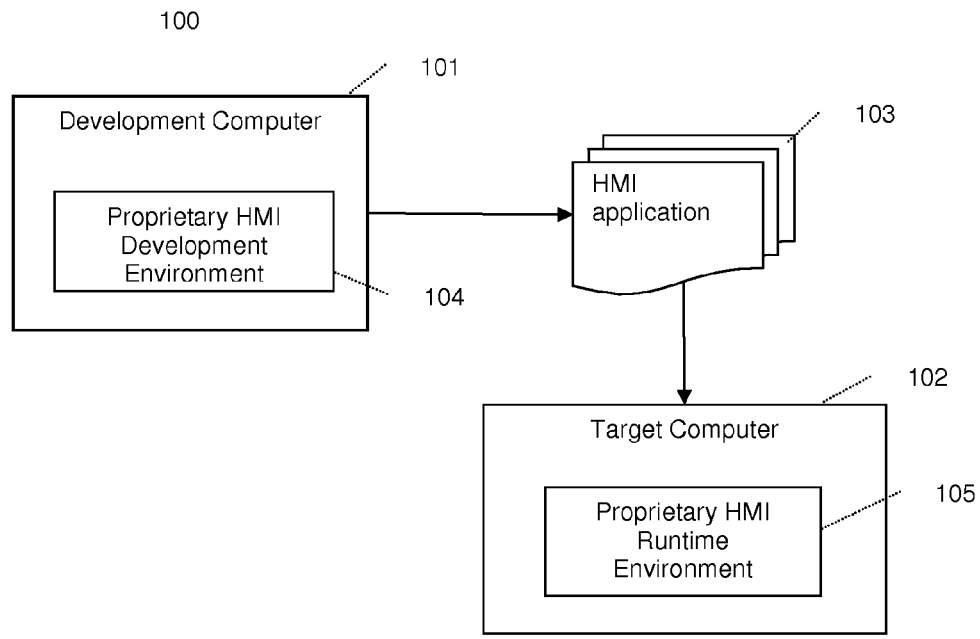
FIG. 1 illustrates the structure of the prior art proprietary HMI development systems that are targeted for use by non-programmers.
Figure 2:
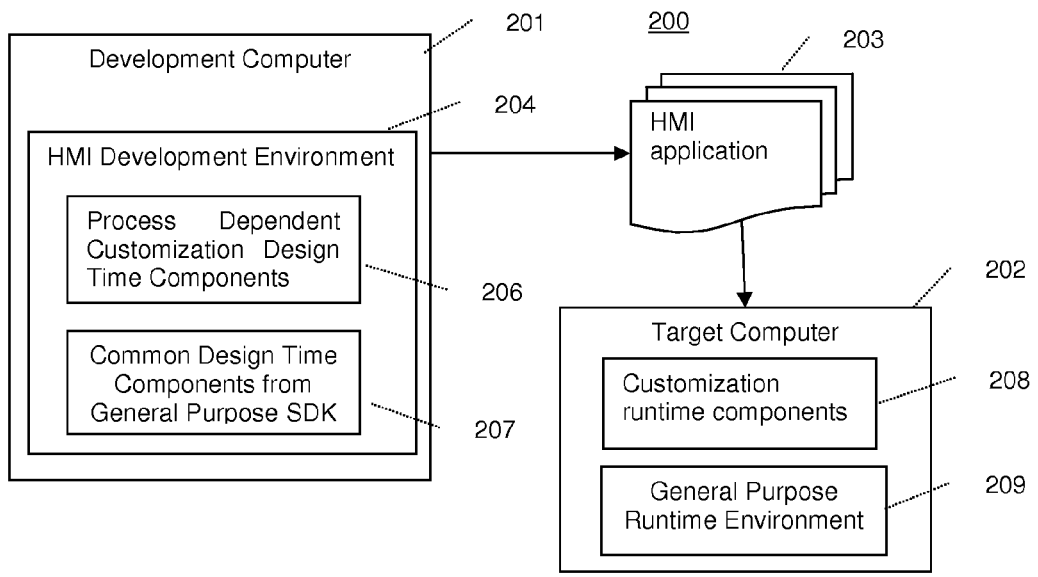
FIG. 2 illustrates the structure of the HMI development system of the present invention.

FIG. 2 illustrates the structure of the HMI development system 200 of the present invention. In common with the prior art system 100, the system 200 has a development computer 201 with a HMI development environment 204, a target computer 202 and a HMI application 203. The differences between the system 200 of the present invention and the prior art system 100 is what resides in the HMI development environment 204 and the target computer 202.

As is shown in FIG. 2, there resides in HMI development environment 204 both process dependent customization design time components 206 and a set of common design time components 207 from a general purpose SDK. As is also shown in FIG. 2, there resides in the target computer 202 customization runtime components 208 and a general purpose runtime environment 209. The HMI development environment 204 is used to create HMI applications 203 that are executable in target computer 202.

Since the general purpose runtime environment 209 is the host for the execution of HMI applications 203, those applications must have formats that are required by that environment. The most commonly used general purpose SDKs as of the filing date of the first U.S. patent application filed for this invention are the NET Framework from Microsoft and the Java SDK from Sun Microsystems. Both have the runtime environment as virtual machines and use byte code as the executable format.

Customization runtime components 208 could if desired be the subset of their process dependent counterpart customization design time components 206 compiled and optimized for a different type of CPU if the target computer 202 and the development computer 201 are of different architecture. Function wise, the common design time components 207 provide the architecture support and basic building blocks of the HMI development environment 204. The customization components 206 mask the complexity of the SDK to the non-programmer user. The non-programmer user is familiar with automation process artifacts and the components 206 expose those artifacts to that user.

Figure 3:
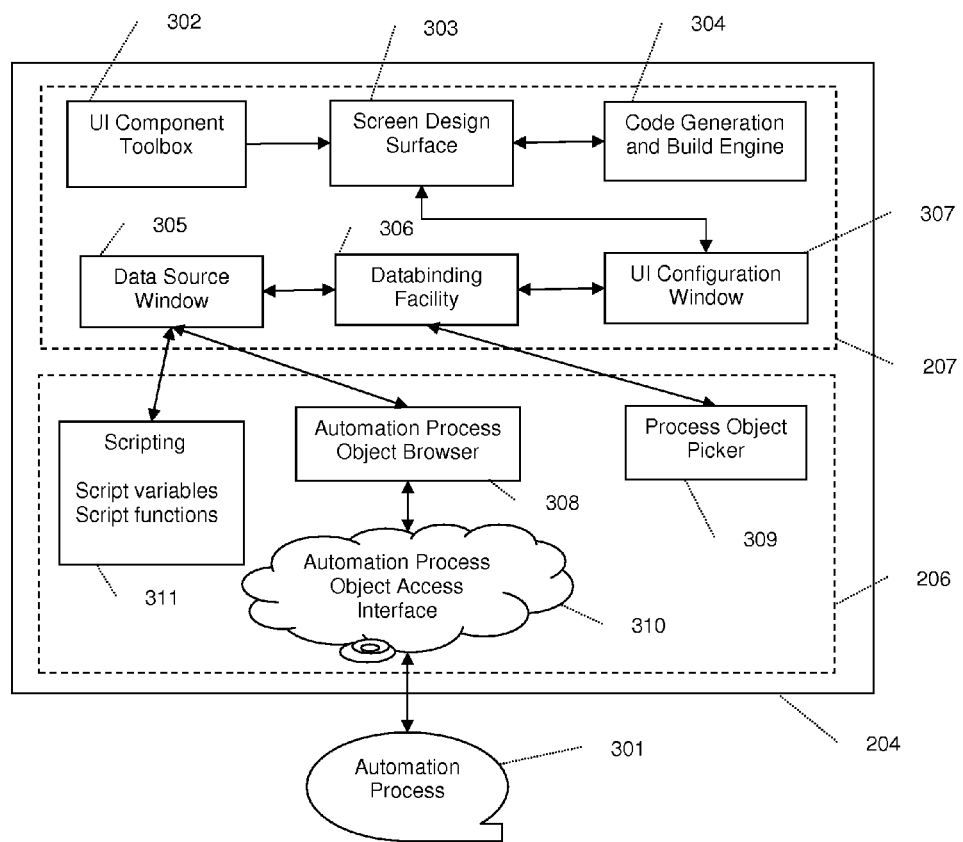
FIG. 3 illustrates in component diagram form for the HMI development system of FIG. 2 one example of the architecture of the HMI development environment.

FIG. 3 illustrates one example of the architecture of the environment 204 for developing HMI applications for automation process 301. It should be appreciated that automation process 301 and thus target computer 202 may be remote from development computer 201.

Figure 3A:
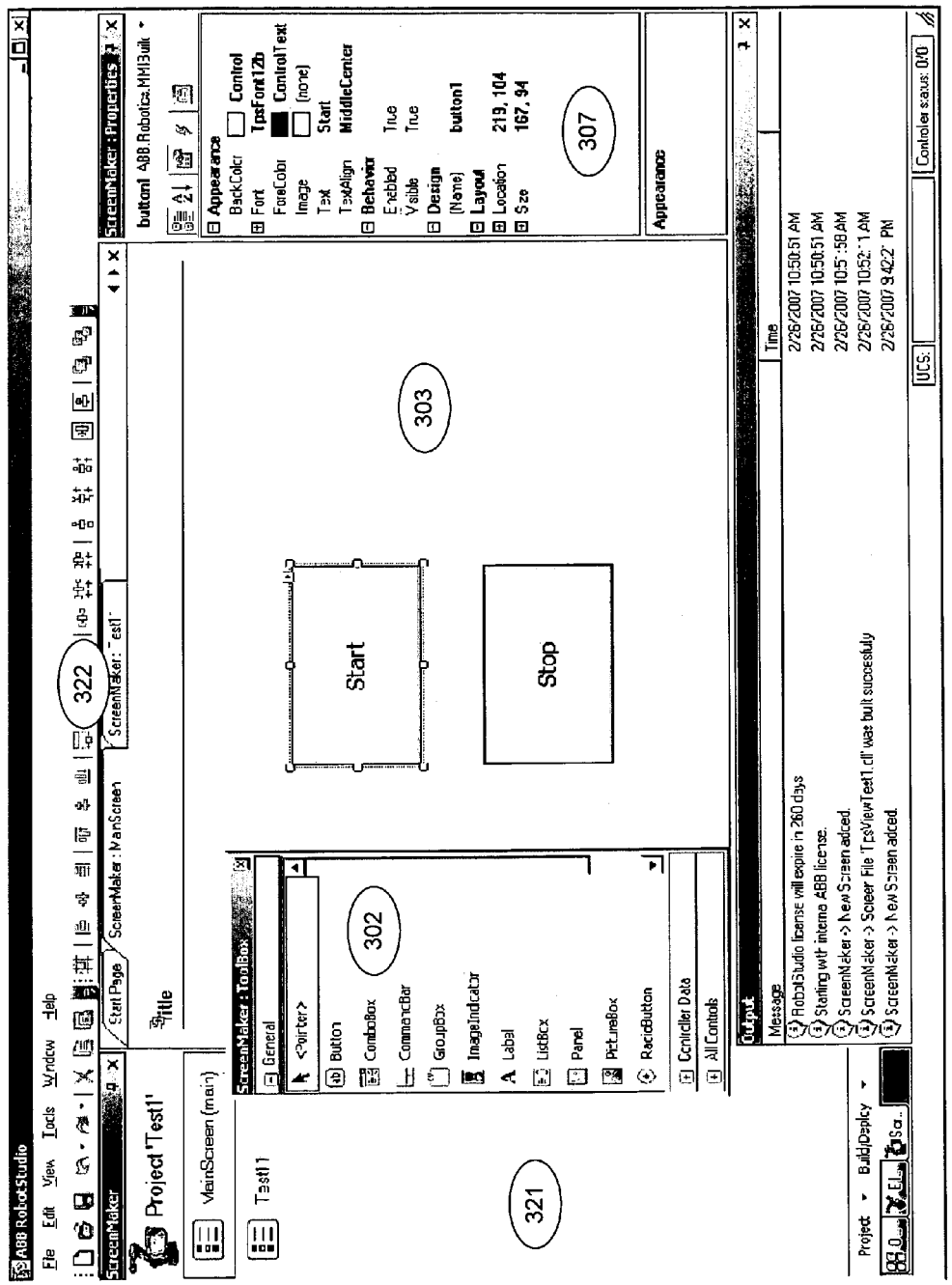
FIG. 3a illustrates for the HMI development system of the present invention an exemplary HMI development system implementation for an exemplary automation process.
Figure 4:
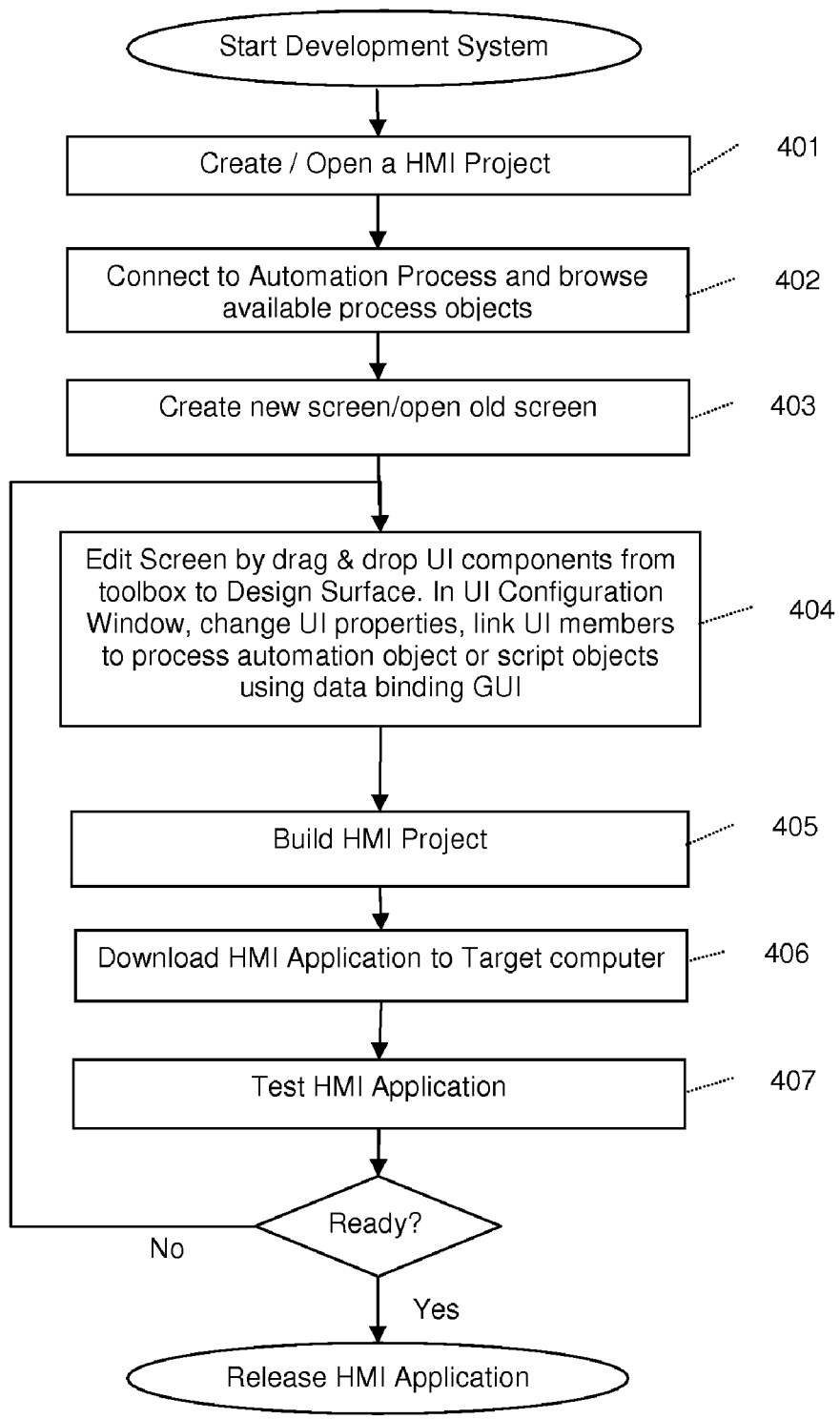
FIG. 4 illustrates an exemplary work flow for the development system shown in FIG. 3.

The flowchart of FIG. 4 shows the workflow for that environment. The screen shot of FIG. 3a show one example of an implementation for the environment of FIG. 3.

Referring to FIG. 3, dotted box 207 shows the common design time components from a general purpose SDK and dotted box 206 shows the process dependent customization design time components. The common design time components 207 are described below followed by the description of the process dependent components 206.

The UI (User Interface) component toolbox 302 is the host for all UI components that can be used to compose a HMI screen. Typical examples of UI components are shown in the toolbox named "ScreenMaker" in FIG. 3a and identified by the reference numeral 302 in that figure, "Label", "Button" and "PictureBox" etc. Another example of a UI component is "CheckBox" which is not shown in box 302.

Referring once again to FIG. 3, the Screen Design Surface 303 serves like a canvas for drawing a picture. It visually shows all the UI components on a screen in a way that closely resembles the runtime appearance of the screen. In addition, the design surface 303 provides the layout capabilities so that the developer can easily position, resize, and align the UI components using simple mouse clicks and/or keyboards. In most implementations, to add a new UI component into a screen, the developer can drag this UI component from the toolbox 302 onto the design surface 303.

The UI configuration window 307 is used for further configuration of a UI component on a screen. For example and as is shown in FIG. 3a, window 307 can be used to change the font and the color of the text for a button. The data source window 305 of FIG. 3 is the place to hold and browse all relevant application data objects available to the HMI. For a HMI targeted to an automation process, the data source window lists all relevant data objects on the automation process 301. This is described below in more detail.

Continuing to refer to FIG. 3, the databinding facility 306 provides the mechanism and the user interfaces to bind a subset of one or more of the available for use application data objects to one or more public members of the user interface objects, typically but not limited to one of its properties or one or more of the user interface objects or a combination of the one or more members and one or more of the user interface objects. In the NET Framework, the public members of a user interface object include fields, properties, methods and events. Databinding is a common built-in feature of the UI programming model in modern general purpose SDKs.

During runtime, the databinding mechanism maintains a synchronized logic connection between a subset of the one or more available for use application data objects and the one or more user interface objects or one or more public members of such objects or a combination thereof that are bound to each other. Whenever the one or more available for use application data objects change, the bound one or more user interface objects or one or more public members of such objects or a combination thereof are changed accordingly and vice versa. This synchronization is triggered automatically by the change on either side of the connection.

It is the UI developer's responsibility during development time to specify which user interface objects or public members of such objects or combination thereof is connected to which one or more of the available for use application data objects. Databinding facility 306 provides the user interface for this binding of the subset of the one or more available for use application data objects to one or more public members of a user interface object or one or more user interface objects or a combination thereof and also allows the user to specify the connection between the objects.

Databinding also allows the UI developer to drag and drop a data object from data source window 305 directly onto the design surface 303. This capability to drag and drop a data object directly on the design surface 303 requires configuring applicable UI components for each object type in the data source window 305. Whenever a data object is dragged and dropped onto the design surface 303, its default UI component is then created and placed on the design surface. In addition, the dragged data object is automatically bound to the created UI component. As can be appreciated, databinding makes it possible and intuitively easy for non programmers to develop a HMI without having to write programming code.

Because of the synchronized logic connection between a UI component and a data object, databinding allows for the separation of the UI aspect in a HMI application from the process logic. A UI is only responsible for the graphic appearance, and has no knowledge about the automation process it controls or displays. This separation make it possible to use any UI component with the same general purpose SDK. Thus the present invention achieves a higher openness as compared to a prior art HMI development system where the UI is mixed with the process logic. As is described in detail below, customizing the databinding facility 306 allows the HMI development system of the present invention to be more useful and have more functionality than the prior art HMI development systems.

Code generation and build engine 304 is responsible for generating and building the source code after the user finishes the layout, the configuration and the databinding of the UI components on a screen. General purpose SDKs such as for example, the NET Framework have this engine as that SDK can generate C# or VB.NET source codes for Windows Forms Design Surface, compile and build into an executable capable of running on any target machine installed with the NET Framework.

The above described components are either directly available in or can be constructed from a general purpose SDK such as the NET Framework. These SDKs provide common features for all HMI development systems. Thus the components described above are grouped together as the common design time components from a general purpose SDK box 207 in FIG. 3.

Dotted box 206 contains the components that are process dependent. In accordance with the present invention, a HMI development system for PLC programmers has the same grouped components 207 as a HMI development system for industrial robot programmers but a different implementation of grouped components 206 compared to the grouped components for the HMI development system for industrial robot programmers.

For a HMI development system targeted to an automation process, the customization components 206 include but are not limited to an automation process object access interface 310, an automation process object browser 308 and a process object picker 309. The automation process object access interface 310 provides the means to access the available objects in the automation process 301 which may be located at or adjacent to or remotely from the location of the development computer 201.

Figure 3B:
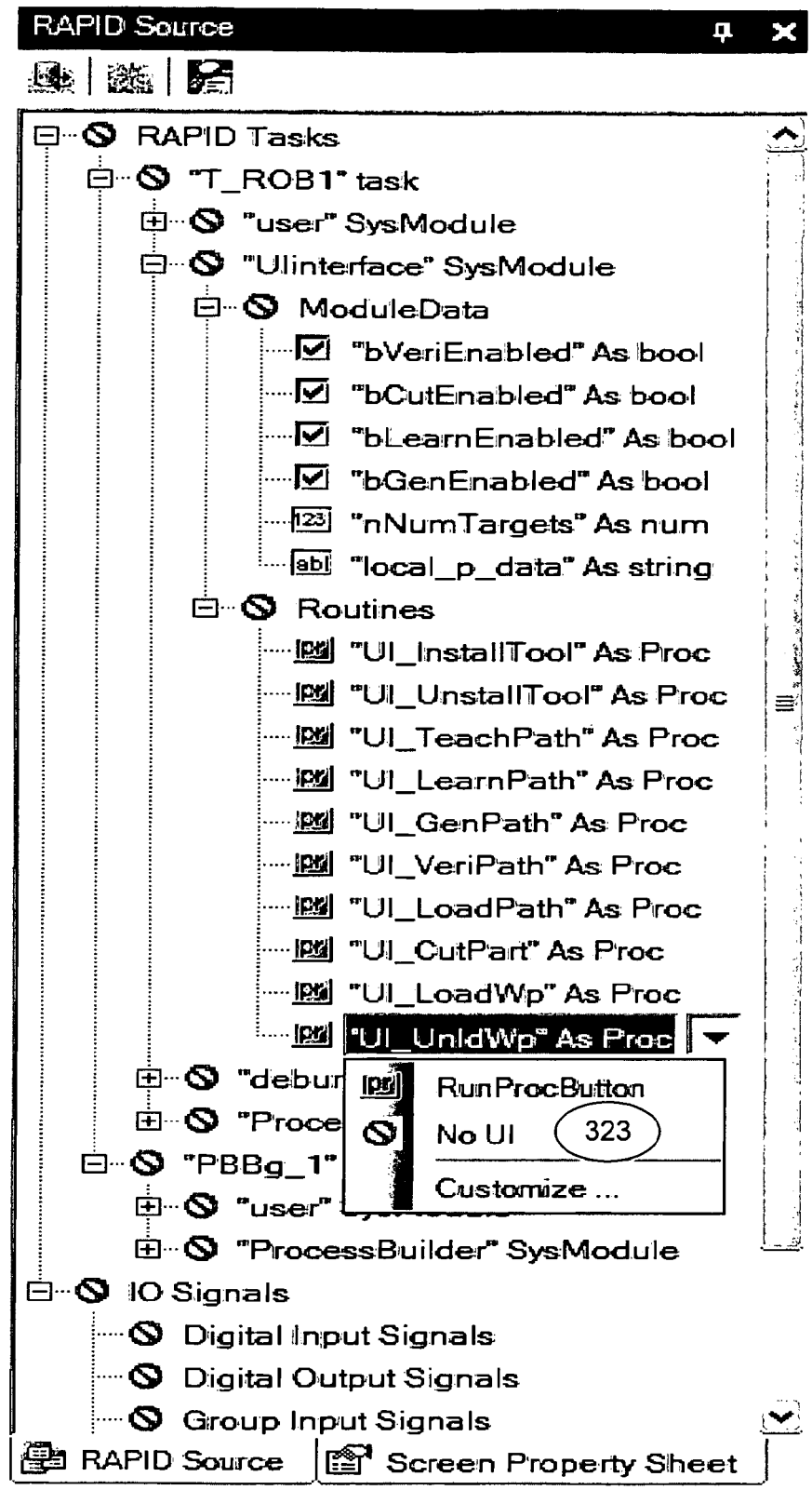
FIG. 3b illustrates for the HMI development system of the present invention an exemplary automation process object browser.

The automation process object browser 308 lists all available objects in the automation process via the access interface 310. The browser 308 serves as an input to the data source window 305, and in particular any data object can be directly dragged and dropped onto the screen design surface 303. An exemplary implementation of object browser 308 is shown in FIG. 3b for a robotic automation process. Box 323 lists all applicable UI components that can bind to the highlighted data object named "UI_UnldWP" As Proc.

Figure 3C:
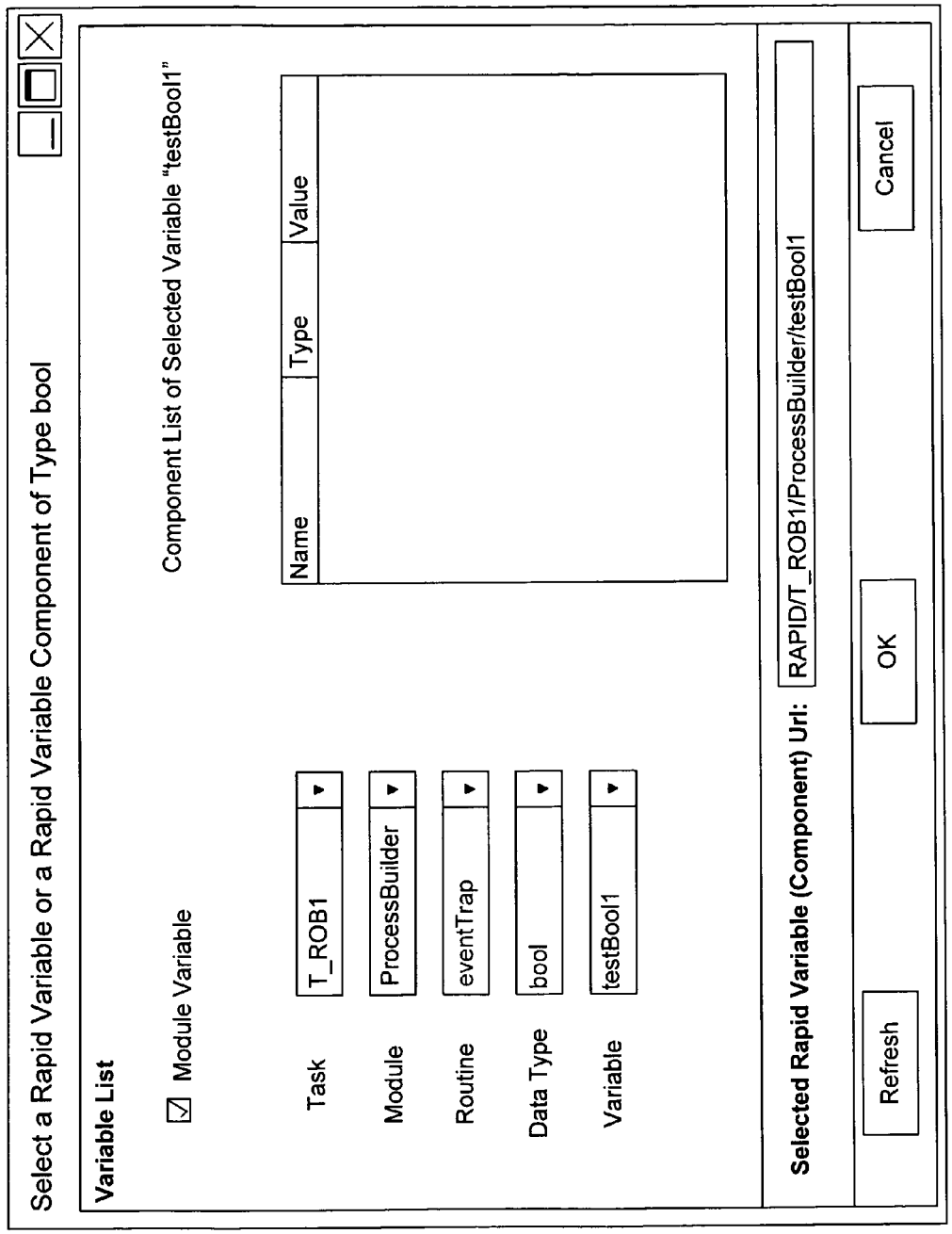
FIG. 3c illustrates for the HMI development system of the present invention an exemplar implementation of an automation process object picker.

The process object picker 309 serves as a customized data binding user interface to let the users easily browse the applicable data objects from the automation process 301 and determines if a process object can be used as a member of a user interface object and binds the compatible automation process objects to the user interface objects. An exemplary implementation of process object picker 309 is shown in FIG. 3c for a robotic automation process. The embodiment for data picker 309 shown in FIG. 3c lists all applicable objects, that is, all Boolean variables, in a robot controller that are bindable to a checkbox in the user interface. The Boolean variables are the variables that are shown in the drop down box named "Variable" in FIG. 3c. FIG. 3c also shows a checkbox named "Module" and a checkbox named "Routine". The "Variable" box shows in FIG. 3c the Boolean variable named "testBool1". That variable is defined in the module level as "ProcessBuilder" is highlighted in the Module checkbox. The script engine 311 allows the user to create temporary variables and functions for binding with the user interfaces.

In a general purpose SDK, the data picker can only list the data objects that have the same type system on the UI side. Quite often the programming languages used on the UI side are different from the programming languages used on the process side. On the UI side, object oriented, component based general purpose programming languages such as C# and Java are often used; while on the process side, simple procedural based special purpose programming languages are often used such as PLC ladder logic and the robot programming language RAPID from ABB. As a result, in the general purpose SDK, the process side data objects have to be converted to the UI side first before shown in the data picker. This approach is not suitable for a HMI developer, who is familiar with the process side but is inexperienced with the UI internals. Therefore customizing the databinding facility 306 to directly list the process side objects in the picker 309 instead of the equivalent objects from the UI side and to automatically filter the inapplicable process objects for a given member of a user interface object masks the complexity of the HMI development environment 204 to the HMI developer who is inexperienced in using such development tools. This customization gives the inexperienced HMI developer the illusion that he/she is only dealing with the process side. Thus a higher level of usability is achieved.

Figure 5:
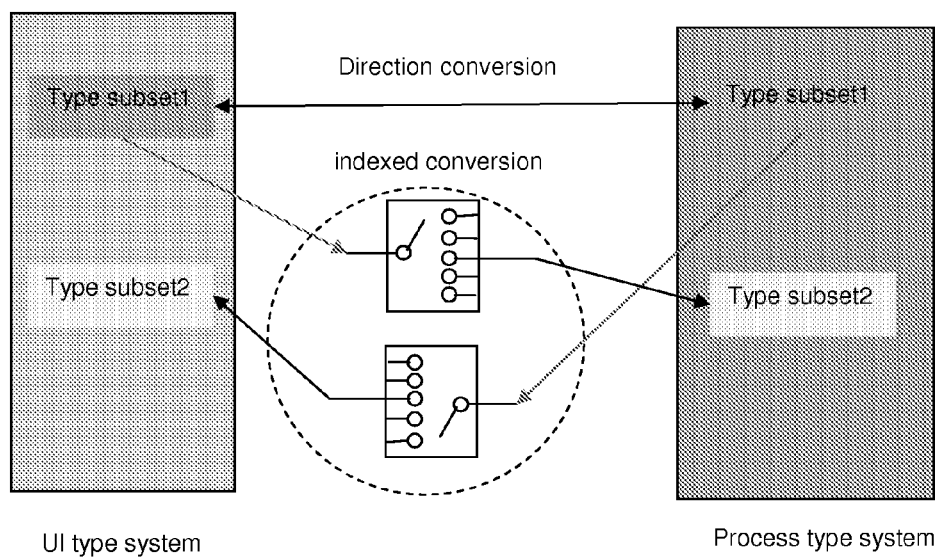
FIG. 5 illustrates a plurality of ways to convert between process types and UI types.

Designing an intelligent object converter for the automation process is therefore very important for the data picker 309. The object converter determines whether a process object can be used for a member of a user interface object, and if so how it can be converted. This means that the object converter also serves as a filter. FIG. 5 shows, without limitation, a direct converter and an indexed converter as two examples of an object converter that can be used with the present invention.

Direct conversion occurs when the nature of the object or class types on the process side and on the UI side is the same but the representation and storage might be different. A typical example of such a type is the numeric type. Different programming languages have different ways to represent and store a numeric value, but they are convertible.

There are some types on either side that cannot be directly converted to any type on the other side. A typical example is the object or class type commonly used in object-oriented programming language but rarely found in procedural language. A simple way to perform conversion is through indexing. The index variable has the type from the first category, most often a numeric type. Its value serves as an index into a predefined set of values that the variable of the non-convertible type could have in a given context. For example, assume that a color of the UI needs to be changed according to the state of a process. The process state is an integer having a value 0, 1 or 2. The color could be predefined as red when the state value is 0, green when 1 and yellow when 2. As can be seen, the process state basically serves as the index variable. Index binding of the one or more user interface objects or the one or more members of the user interface objects that have one data type and the subset of the available for use data objects that has another data type can be accomplished by having in the databinding facility a lookup table known as a hash table. The table has at least two columns and as many rows as is needed. One of the two columns known as the index has the one data type and the other of the two columns known as the expression has the another data type and thus each row has an index and an expression. The databinding facility uses the table to bind one or more of the objects in the subset of the available for use data objects and one or more of the user interface objects or the one or more members of the user interface objects.

In one use of the table for index binding an available for use application data object is chosen to have the same data type as the table's index variable. Therefore this application data type serves as the table index and for a selected row of the table the associated expression value is obtained. Since the user interface object or its member has the same data type as the expression, the selected expression value can be assigned to the application data object.

In another use of the table for index binding the user interface object or its member is chosen to have the same data type as the table's index variable. Therefore this user interface object or its member serves as the table index and for a selected row of the table the associated expression value is obtained. Since the available for use application data object has the same data type as the expression, the selected expression value can be assigned to the user interface object or its member.

It should be appreciated that the table can be indexed by a variable of any arbitrarily chosen data type.

The components shown in FIG. 3 illustrate one example of the architecture of the HMI development environment 204. Variations, merging and splitting of these components are possible. More components might be added to facilitate more functionalities, as shown in the exemplary implementation of FIG. 3a, where component 321 provides project management and component 322 is layout toolbar.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for developing for an automation process a viewable screen for presenting information, said viewable screen having user interface objects, said automation process having a set of data objects available for use in said system, said system comprising:
   a processor;
   a memory storing a set of common design time components from a general purpose software development kit comprising a screen design surface onto which said user interface objects are placed and a databinding facility; and
   a set of customization components comprising:
     an automation process object interface that allows access to said available for use automation process data objects, and
     a process object picker serving as a user interface to said databinding facility to allow:

browsing a subset of said available for use automation process data objects, and selecting of one or more of said available for use automation process data objects in said subset for binding by said databinding facility either to one or more of members of said user interface objects, one or more of said user interface objects, or a combination of one or more of said members and one or more of said user interface objects, each of said one or more subset data objects influencing both the appearance and behavior of said screen when so bound; and wherein a data object of said one or more subset data objects of said available for use automation process data objects can be dragged and dropped onto said screen design surface so as to create a corresponding user interface object, said corresponding user interface object automatically bound to said dragged data object when said dragged data object is placed on said screen design surface.

2. The system of claim 1 wherein said set of customization components further comprises an automation process object browser that lists all of said available for use automation process data objects.

3. The system of claim 1 wherein said one or more user interface objects or said one or more members of said user interface objects has a predetermined data type and said subset of said available for use data objects has said predetermined data type.

4. The system of claim 1 wherein said one or more user interface objects or said one or more members of said user interface objects has one data type and said subset of said available for use data objects has another data type, said databinding facility comprising a lookup table of at least two columns such that one of said two columns has said one data type and the other of said two columns has said another data type, said databinding facility using said table to bind one or more of said objects in said subset of said available for use data objects and one or more of said user interface objects or said one or more members of said user interface objects.

5. A computer program product on a non-transitory tangible computer medium for developing for an automation process a viewable screen for presenting information, said viewable screen having user interface objects, said automation process having a set of data objects available for use in said computer program product, said computer program product comprising:

computer usable program code configured to provide a set of common design time components from a general purpose software development kit, said common design time components comprising a screen design surface onto which said user interface objects are placed and databinding facility; and computer usable program code configured to provide a set of customization components comprising:

computer usable program code configured to provide an automation process object interface that allows access to said available for use automation process data objects, and computer usable program code configured to provide a process object picker serving as a user interface to said databinding facility to allow: browsing a subset of said available for use automation process data objects, and selecting of one or more of said objects in said subset for binding by said databinding facility either to one or more of members of said user interface objects, one or more of said user interface objects, or a combination of one or more of said members and one or more of said user interface objects, each of said one or more subset data objects influencing both the appearance and behavior of said screen when so bound; and wherein a data object of said one or more subset data objects of said available for use automation process data objects can be dragged and dropped onto said screen design surface so as to create a corresponding user interface object, said corresponding user interface object automatically bound to said dragged data object when said dragged data object is placed on said screen design surface.

6. The computer program product of claim 5 wherein said set of customization components further comprises computer usable program code configured to provide an automation process object browser that lists all of said available for use automation process data objects.

7. The computer program product of claim 5 wherein said one or more user interface objects or said one or more members of said user interface objects has a predetermined data type and said subset of said available for use data objects has said predetermined data type.

8. The computer program product of claim 5 wherein said one or more user interface objects or said one or more members of said user interface objects has one data type and said subset of said available for use data objects has another data type, said databinding facility comprising a lookup table of at least two columns such that one of said two columns has said one data type and the other of said two columns has said another data type, said databinding facility using said table to bind one or more of said objects in said subset of said available for use data objects and one or more of said user interface objects or said one or more members of said user interface objects.

9. A system for developing for an automation process a viewable screen having user interface objects, said automation process having a set of data objects available for use in said system, said system comprising: a processor and a memory; said memory having therein program code usable by computer, said program code comprising: code configured to provide a set of common design time components from a general purpose software development kit, said common design time components comprising a screen design surface onto which said user interface objects are placed and a databinding facility; and code configured to provide a set of customization components comprising: code configured to provide an automation process object interface that allows access to said available for use automation process data objects, and code configured to provide a process object picker serving as a user interface to said databinding facility to allow: browsing a subset of said available for use automation process data objects, and selecting of one or more of said objects in said subset for binding by said databinding facility either to one or more of members of said user interface objects, one or more of said user interface objects, or a combination of one or more of said members and one or more of said user interface objects, each of said one or more subset data objects influencing both the appearance and behavior of said screen when so bound; and wherein a data object of said one or more subset data objects of said available for use automation process data objects can be dragged and dropped onto said screen design surface so as to create a corresponding user interface object, said corresponding user interface object automatically bound to said dragged data object when said dragged data object is placed on said screen design surface.

10. The system of claim 9 wherein said set of customization components further comprises program code configured to provide an automation process object browser that lists all of said available for use automation process data objects.

11. The system of claim 9 wherein said one or more user interface objects or said one or more members of said user interface objects has a predetermined data type and said subset of said available for use data objects has said predetermined data type.

12. The system of claim 9 wherein said one or more user interface objects or said one or more members of said user interface objects has one data type and said subset of said available for use data objects has another data type, said databinding facility comprising a lookup table of at least two columns such that one of said two columns has said one data type and the other of said two columns has said another data type, said databinding facility using said table to bind one or more of said objects in said subset of said available for use data objects and one or more of said user interface objects or said one or more members of said user interface objects.

* * * * *